United States Patent
Subramanian

(10) Patent No.: US 8,189,220 B2
(45) Date of Patent: May 29, 2012

(54) REMOTE PRINTING SYSTEM USING FEDERATED IDENTITY WEB SERVICES

(75) Inventor: Sriram Subramanian, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1094 days.

(21) Appl. No.: 12/059,413

(22) Filed: Mar. 31, 2008

(65) Prior Publication Data

US 2009/0248632 A1 Oct. 1, 2009

(51) Int. Cl.
*G06F 15/00* (2006.01)
*G06F 3/12* (2006.01)
*G06K 1/00* (2006.01)

(52) U.S. Cl. ........................ 358/1.15; 358/1.13

(58) Field of Classification Search .................. None
See application file for complete search history.

(56) References Cited

U.S. PATENT DOCUMENTS

| 7,079,291 | B2 | 7/2006 | Ichikawa |
|---|---|---|---|
| 7,256,900 | B1 * | 8/2007 | Hanaoka ................. 358/1.12 |
| 2002/0138564 | A1 | 9/2002 | Treptow et al. |
| 2003/0002071 | A1 | 1/2003 | Berkema et al. |
| 2003/0137690 | A1 | 7/2003 | Hoover et al. |
| 2004/0001217 | A1 | 1/2004 | Wu |
| 2005/0132094 | A1 | 6/2005 | Wu |
| 2005/0266839 | A1 | 12/2005 | Paul et al. |
| 2007/0035763 | A1 | 2/2007 | Bard et al. |
| 2008/0117451 | A1 * | 5/2008 | Wang ..................... 358/1.15 |

* cited by examiner

*Primary Examiner* — Douglas Tran

(57) ABSTRACT

A data processing system comprises a print-enabled identity server. The print-enabled identity server comprises an identity provider operative in a federated identity system that authenticates a user, and stores profile information and payment information. The print-enabled identity server further comprises a Federated Print Search Responder (FPSR) and a discovery service hosted by the identity provider that operate in combination to answer client print-search queries for finding at least one remote printer according to client-designated criteria. An identity-based payment service manages user payment transactions.

20 Claims, 9 Drawing Sheets

Welcome Joe. The list below shows all your print jobs in the past 6 months. You can either print this content again, or share with your contacts by sending an invitation. This will allow them to print the jobs you share at a PSP of their choice.

| | |
|---|---|
| Carribean vacation photos | view/share |
| Digital ID World conference presentation | view/share |
| Product posters for Marketing division | view/share |

FIG. 2B

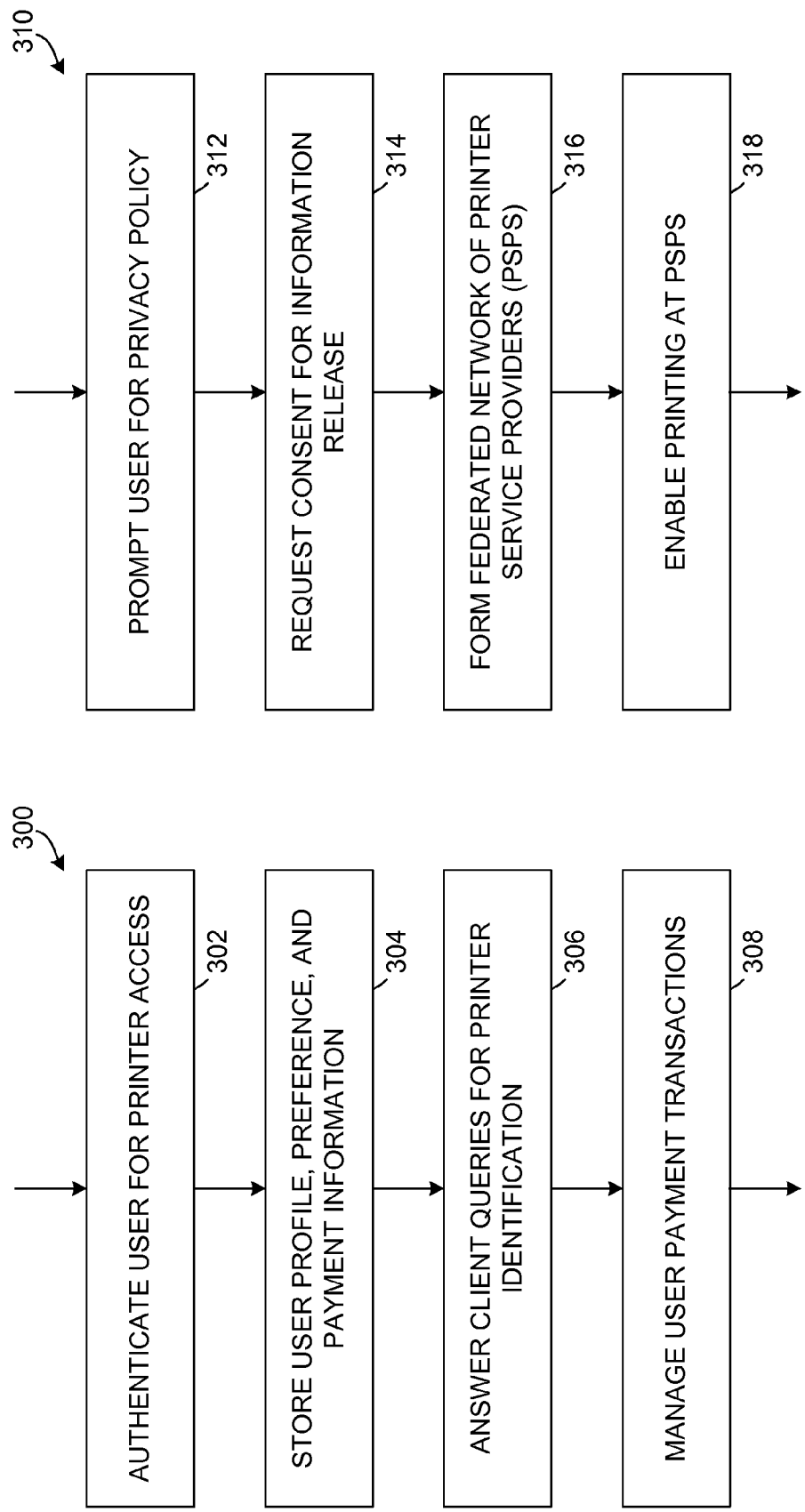

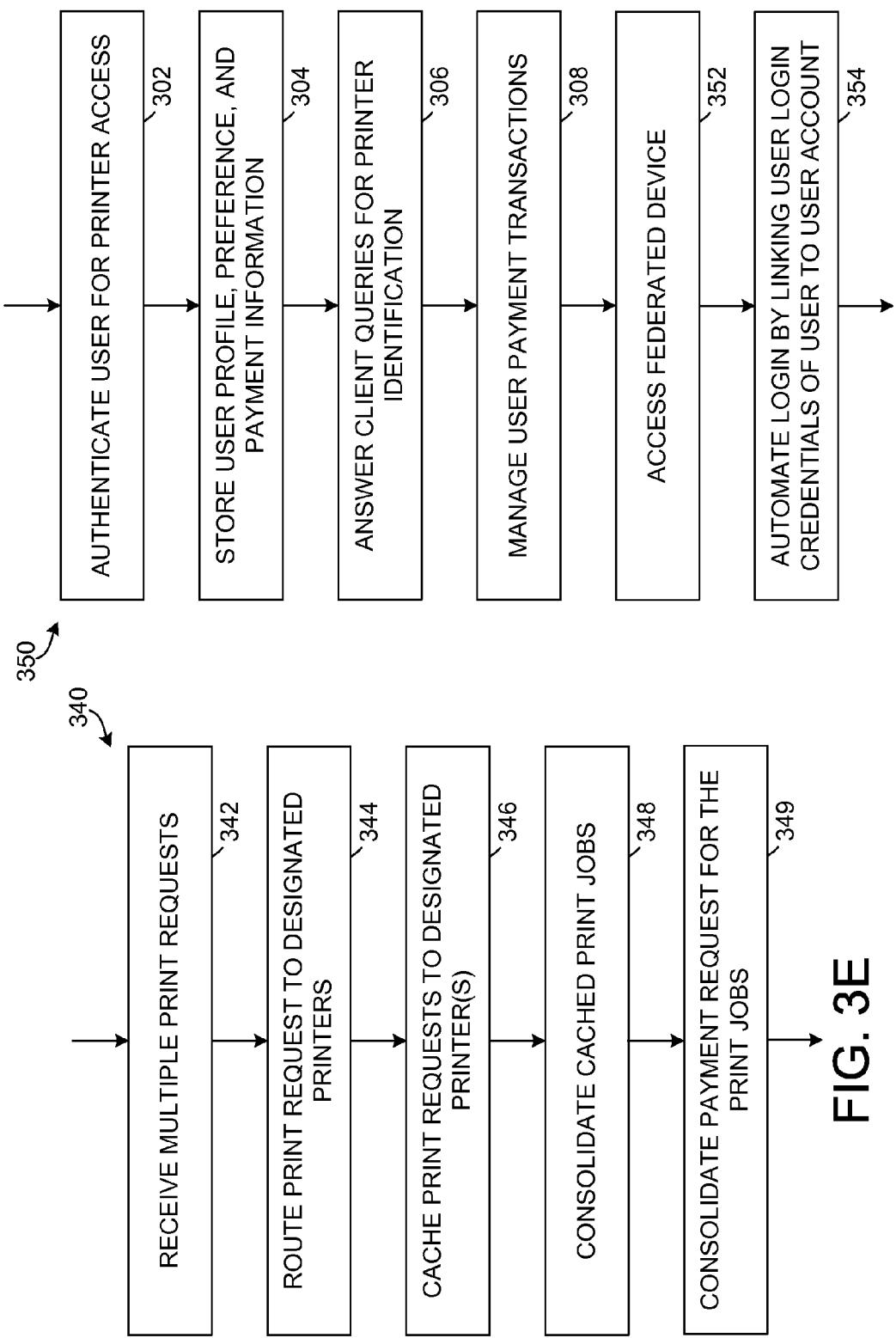

REMOTE PRINTING SYSTEM USING FEDERATED IDENTITY WEB SERVICES

BACKGROUND

Even though the penetration of printers at home and in the office has increased in the last few years, a significant unmet demand for Remote Printing remains. With the exponential growth of mobile devices and nearly ubiquitous connectivity, a large number of people use laptops and PDAs on the move. Another good percentage of the population does not have easy access to printers. These market segments, and others, can benefit from a printing service which is available on-demand.

SUMMARY

An embodiment of a data processing system comprises a print-enabled identity server. The print-enabled identity server comprises an identity provider operative in a federated identity system that authenticates a user, and stores profile information and payment information. The print-enabled identity server further comprises a Federated Print Search Responder (FPSR) and a discovery service hosted by the identity provider that operate in combination to answer client print-search queries for finding at least one remote printer according to client-designated criteria. An identity-based payment service manages user payment transactions.

BRIEF DESCRIPTION OF THE DRAWINGS

Embodiments of the invention relating to both structure and method of operation may best be understood by referring to the following description and accompanying drawings:

FIG. 2B is a pictorial screen view showing an example screen that can be formed by the print job view/share application at a Print Service Provider (PSP) portal page;

FIGS. 3A through 3F are flow charts illustrating one or more embodiments or aspects of a computer-executed method print management in a federated identity system;

DETAILED DESCRIPTION

Embodiments of data processing systems, methods, and articles of manufacture enable remote printing based on federated identity web services. The illustrative systems, methods, and articles of manufacture enable on-demand printing, anytime and in essentially any Print Service Provider (PSP) location with an effort of a few clicks.

Consumers often have difficulty printing online through Print Service Providers (PSPs) for several reasons. First, one has to maintain accounts with multiple PSPs to enable printing of different types of content, for example photographs, posters, and the like. Second, the consumer has the task of finding a PSP that satisfies printing criteria and conditions. The illustrative data processing systems and methods enable consumers of web portals such as Snapfish to schedule print jobs to a PSP of choice with selection factors such as type of digital printer for the requested job type, physical location of the print job, price limit and other such search criteria.

Remote printing is defined as a paid service which enables users to submit print jobs to printers that can be distributed in different geographical locations. The systems and methods depicted herein enable sophisticated management of user's privacy and policy decisions. The illustrative systems and methods also enable location-based searches for printers, for example to find and send a print job to a printer that is physically nearest to the requester. The depicted model enables a user experience that is nearly as seamless as printing locally.

Figure 1:
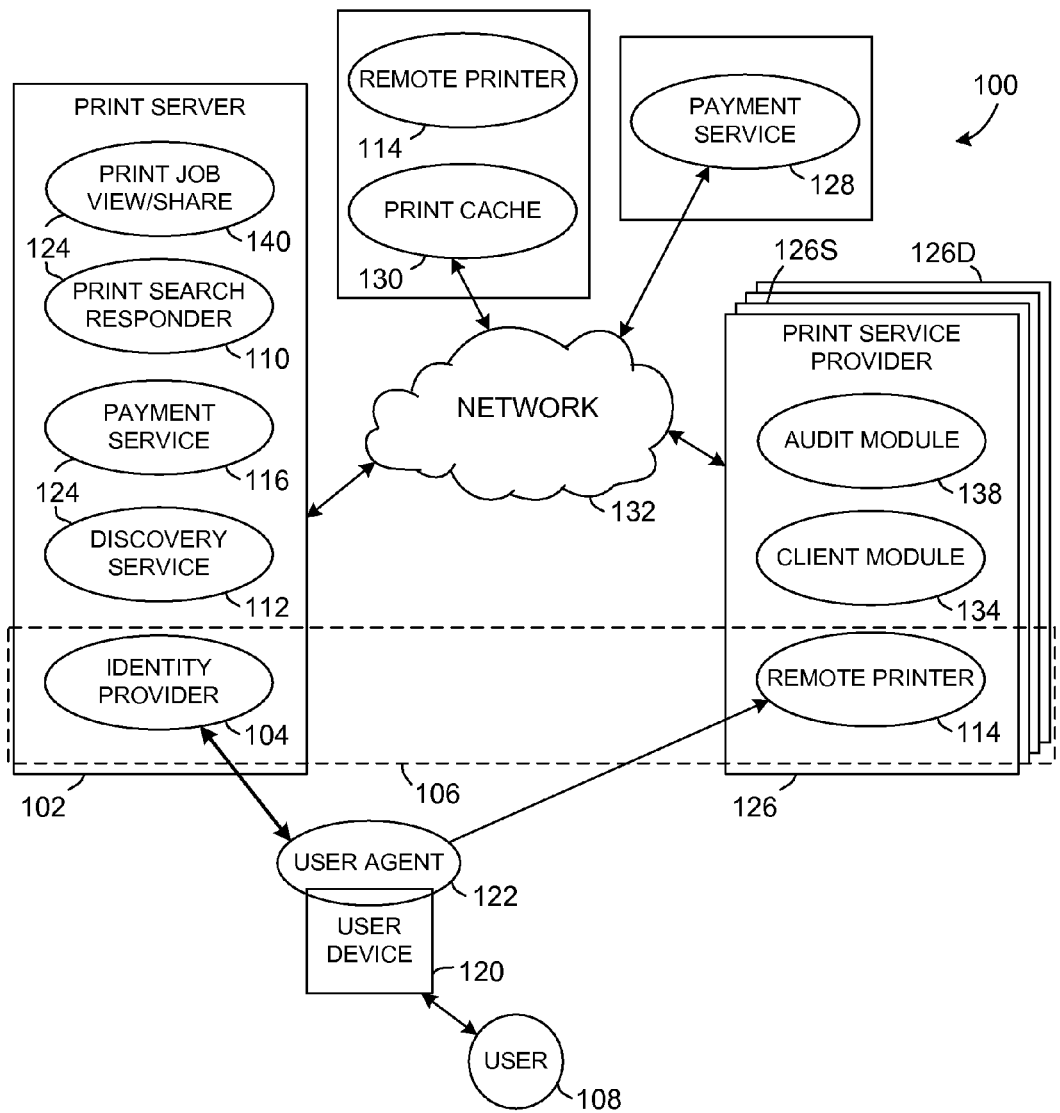
FIG. 1 is a schematic block diagram depicting an embodiment of a data processing system that facilitates remote printing on federated identity web services.

Referring to FIG. 1, a schematic block diagram illustrates an embodiment of a data processing system 100 that facilitates remote printing on federated identity web services. The data processing system 100 has a print-enabled identity server 102 comprising an identity provider 104 operative in a federated identity system 106 that authenticates a user 108, and stores profile information and payment information. The print-enabled identity server 102 further comprises a Federated Print Search Responder (FPSR) 110 and a discovery service 112 hosted by the identity provider 104 that operate in combination to answer client print-search queries for finding one or more remote printers 114 according to client-designated criteria. An identity-based payment service 116 manages user payment transactions.

The payment service 116 can be hosted by the print-enabled identity server 102 in association with the identity provider 104, or elsewhere. For example, the payment service 116 can be hosted outside the print-enabled identity server 102 such as at a source print service provider (PSP) since many users may not have account profiles with the identity provider 104, in which case a discovery service 112 in association with the identity provider 104 can send a billing request to the user's payment service at the source PSP.

The identity provider 104, the Federated Print Search Responder (FPSR) 110, the discovery service 112, and the identity-based payment service 116 can be configured for installation and integration with one or more print service provider (PSP) online infrastructures in a federated network of PSPs 126, thereby enabling printing at PSPs 126 in the federated network 132 without requiring a user to have payment accounts with the PSPs 126 in the federated network 132.

The Federated Print Search Responder (FPSR) 110 can be configured to respond to search queries issued by users 108 according to search criteria such as payment service provider location, print job price limits and ranges, printer type, printer capabilities, print options, transaction time limits and ranges, and the like.

In some configurations, the data processing system 100 can further comprise a user device 120. For example, the data processing system 100 can be implemented to include one or more, but typically many user devices 120 that use network communication to operate in combination with the print-enabled identity server 102. In other applications, usages, or configurations, user devices 120 can operate independently from the print-enabled identity server 102 and data processing system 100.

A user agent 122 can execute operations on the user device 120 such as fetching a user authentication token from the identity provider, sending queries to the identity provider specifying search criteria for determining a target printer, submitting print jobs to a remote printing server identified by the identity provider, and a variety of other operations and functions. In some implementations, a user agent 122 can automate login to the identity provider 104 by linking system login credentials of the user with an associated account at the identity provider 104.

A user device 120 can be any device with communication functionality such as network connection capability, for example that includes a web-browser. For example, a user device 120 can be a computer, a desktop personal computer (PC), other PC, or a mobile device such as a laptop, personal digital assistant (PDA), mobile telephone, and the like.

In some embodiments, the print-enabled identity server 102 can comprise multiple software modules 124 that perform various operations such as routing print jobs to a selected destination print service provider (PSP) 126, identifying the location of a user's payment service 128 and sending a billing request to the user's payment service 128, and others. Other operations can include auditing transactions such as logging information on source and destination print service providers (PSPs), the amount charged to the user, transaction information, and the like. A print cache 130 can be included in the data processing system 100 that caches print jobs and consolidates submission of the cached print jobs.

Some data processing system 100 configurations can further comprise a user device 120 and a user agent 122. The user agent 122 can be integrated with the user device 120 and configured to send to the print-enabled identity server 102 a request for an electronic print job directed to at least one print service provider (PSP) 126. The print-enabled identity server 102 is configured to relay the electronic print job to a destination PSP system.

The data processing system 100 can be implemented with multiple transaction audit modules 138 that can be distributed to a source print service provider (PSP) 126S, the print-enabled identity server 102, and a destination PSP 126D and operate to log detailed audit trails of transaction and financial information.

A print job view/share application 140 can be included in the data processing system 100 and can operate to create a consolidated list of print job history across multiple print service providers (PSPs) 126 for a particular user, and enables the user to view the consolidated list and selectively grant access by sending invitation links to user contacts.

The print job view/share applications 140 enables a user to obtain a consolidated view of the print job history across multiple PSPs 126. The user can view the list and selectively grant access by sending invitation links to the user's contacts. For instance, after printing pictures at Snapfish in the United States, a user can "share" the print job remotely with selected user contacts, even internationally. The user contacts receive an email link. When the contacts click on the link, options (if any) for printing the pictures at a PSP near the contacts' residence are presented to the contacts. Assuming some PSPs are available at the remote locations that are part of the enabled PSP network, the contacts can select a destination PSP, and software modules in the print-enabled identity server send the cached data to the destination PSP for printing. The entire transaction takes place without the user having to transmit any data to the contacts. Only the invitation link is sent.

In some data processing systems, a privacy management controller can be operative in the federated identity system that prompts the user for determination of privacy policy decisions and requests consent before releasing information to a third party.

The illustrative print-enabled identity server 102 simplifies remote printing, particularly in comparison with web interfaces that enable users to submit material for printing, for example digital pictures. In such web interfaces, the user is required to create a profile with the vendor website and submit the material specifically through the website. A user submits material to the web interface for printing through a process of login to the website, submission of documents, and entering of payment information, all using the web interface. The overall experience can be quite cumbersome and lengthy.

Figure 2A:
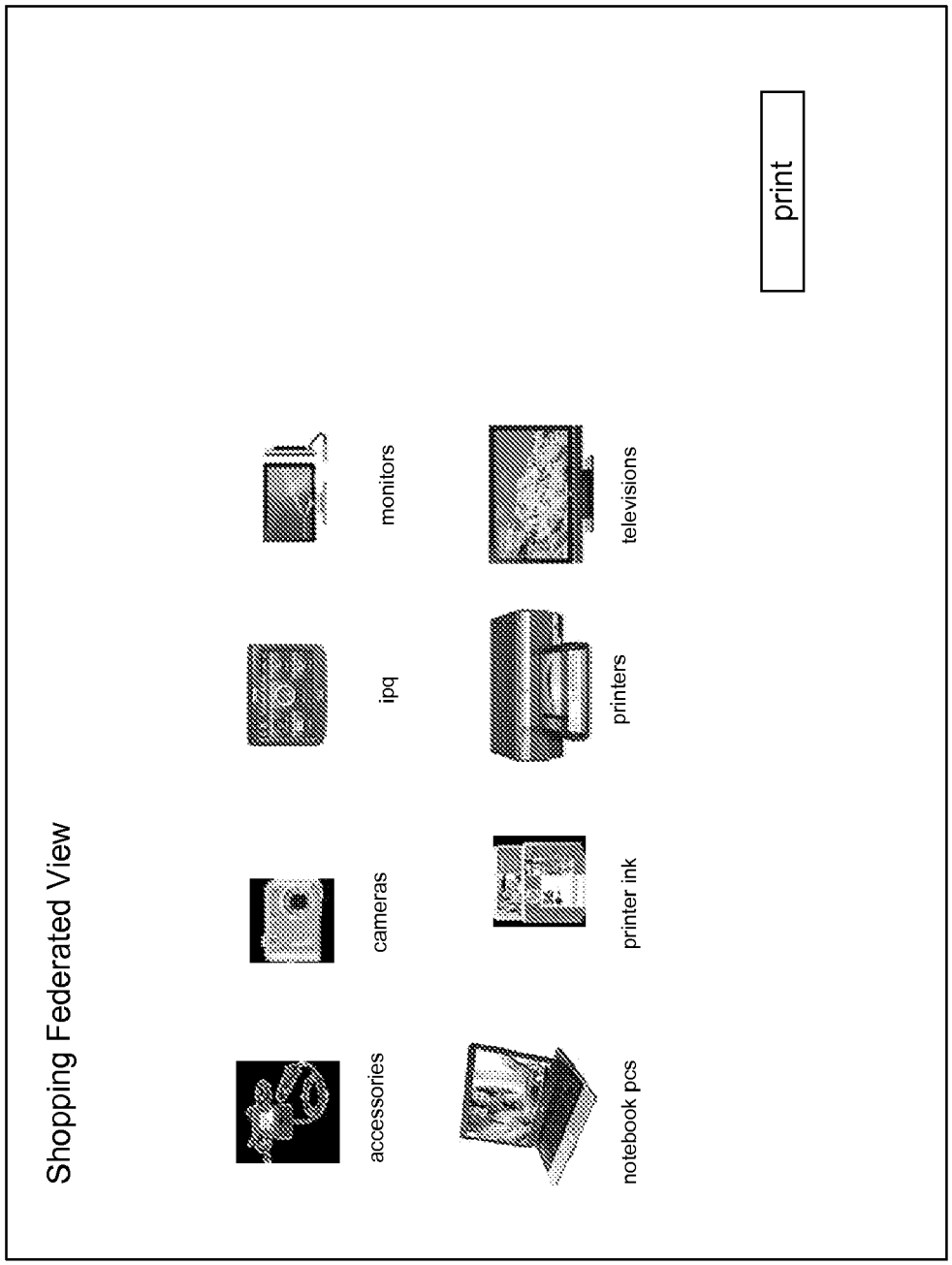
FIG. 2A is a pictorial screen view illustrating an example of a "remote print" gadget that can be embedded on various content portals.

Referring to FIG. 2A, a pictorial screen view shows a "remote print" widget that can be embedded on various content portals, for example Google, MySpace, and the like, that cooperate as partners, enabling users of the content portals to access service and enabling printing at a Print Service Provider (PSP) of a user's choice.

Referring to FIG. 2B, a pictorial screen view illustrates an example screen that can be formed by the print job view/share application at a Print Service Provider (PSP) portal page.

Figure 3D:
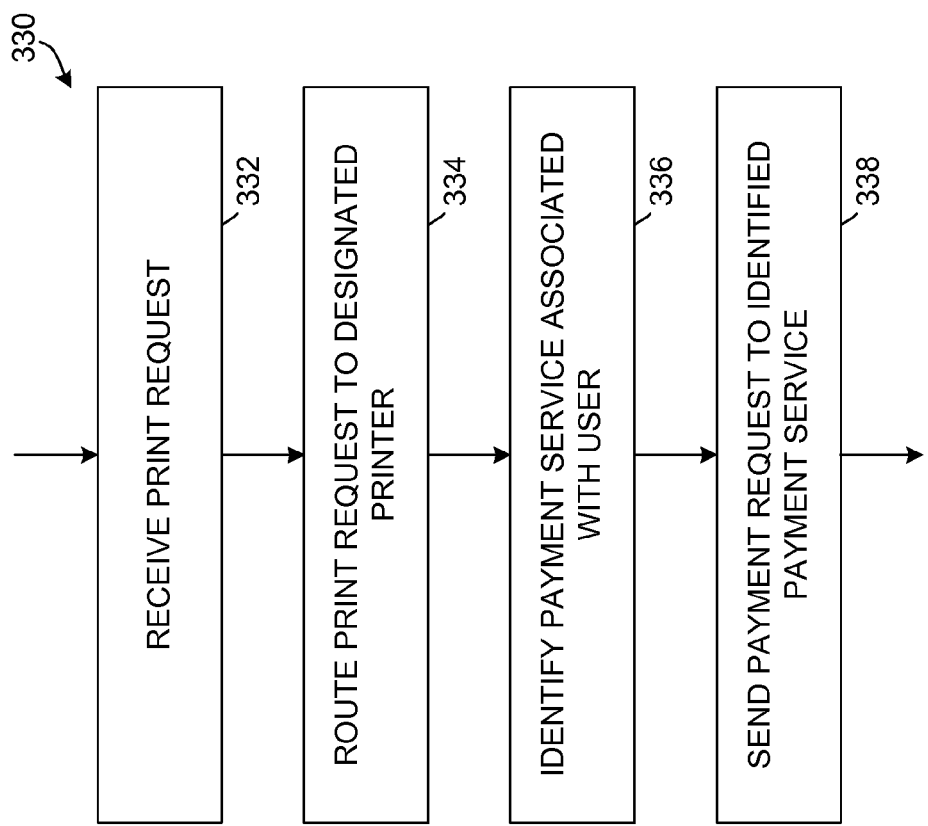

Referring to FIGS. 3A through 3F, flow charts illustrate one or more embodiments or aspects of a computer-executed method 300 for print management in a federated identity system. Referring to FIG. 3A, the method 300 comprises authenticating 302 a user for printing access in a federated identity system, and storing 304 user profile, preference, and payment information in the federated identity system. The method 300 further comprises answering 306 client queries for identifying at least one remote printer according to client-designated criteria. For example, response 306 can be made to search queries issued by users according to search criteria such as payment service provider location, print job price limits and ranges, printer type, printer capabilities, print options, transaction time limits and ranges, and others. User payment transactions are managed 308 for a user who holds an account with at least one print service provider (PSP) of PSP members of the federated identity system.

Referring to FIG. 3B, in some implementations or conditions the method 310 can further comprise prompting 312 the user for determination of privacy policy decisions and preferences, and requesting 314 consent before releasing information to a third party. In some embodiments, the method 310 can further comprise forming 316 a federated network comprising a plurality of printer service provider (PSP) online infrastructures, and enabling 318 printing at PSPs in the federated network without requiring a user to have payment accounts with the PSPs in the federated network.

Figure 3C:
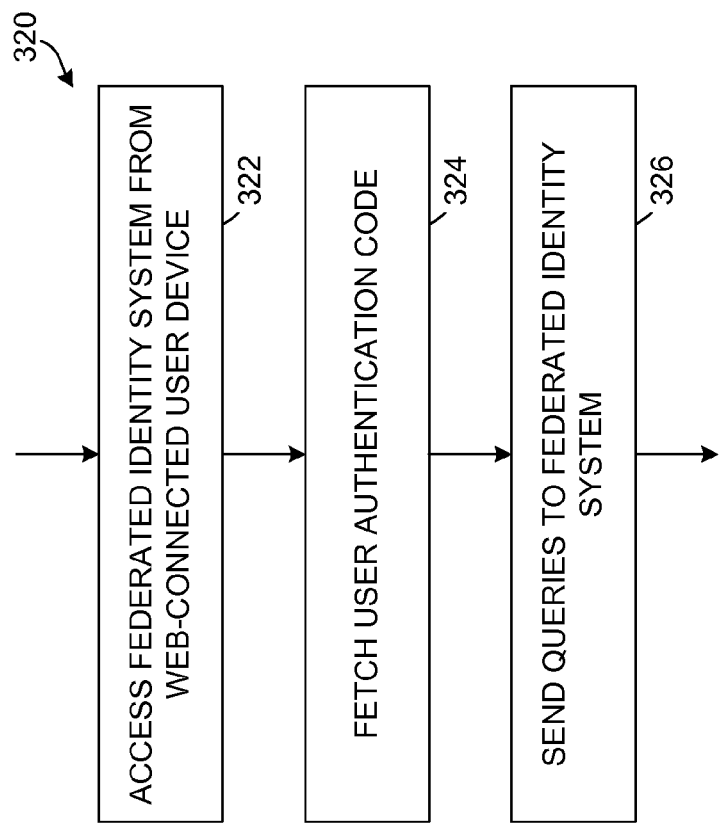

As shown in FIG. 3C, a print management method 320 enables accessing 322 the federated identity system from a user device with web connectivity by fetching 324 a user authentication token, and sending 326 queries to the federated identity system. The queries can specify search criteria for determining a target printer whereby the federated identity system submits print jobs to a remote printing server.

Referring to FIG. 3D, a print management method 330 can manage multiple printers, for example by receiving 332 a print request and routing 334 the print request to a designated printer of the multiple printers. A payment service is identified 336 which is associated with a user and the print request. A payment request is sent 338 to the identified payment service. For receipt of multiple print requests, as shown in FIG. 3E, a print management method for managing 340 multiple printers can comprise receiving 342 multiple print requests and routing 344 the print requests to designated printers of the multiple printers. Print jobs corresponding to the print requests to at least one of the designated printers are cached 346 and consolidating submission of the cached print jobs is consolidated 348. A payment request of the consolidated print jobs can also be consolidated 349.

Referring to FIG. 3F, in data processing system configurations that include a user device, a method for managing 350 print services can further comprise accessing 352 the federated identity system from a user device with web connectivity by automating 354 login to the identity provider by linking system login credentials of the user with an associated account at the identity provider.

An example implementation of the depicted system and method for remote printing based on federated identity web services can include several components based on Security Assertion Markup Language (SAML) and Liberty Alliance federation protocols and standards. SAML is a standard for exchanging authentication and authorization data between security domains, specifically between an identity provider which produces assertions and a service provider, operative as a consumer of assertions. Details of SAML and Liberty Alliance protocols or frameworks are described on Liberty Alliance and OASIS websites.

Figure 4:
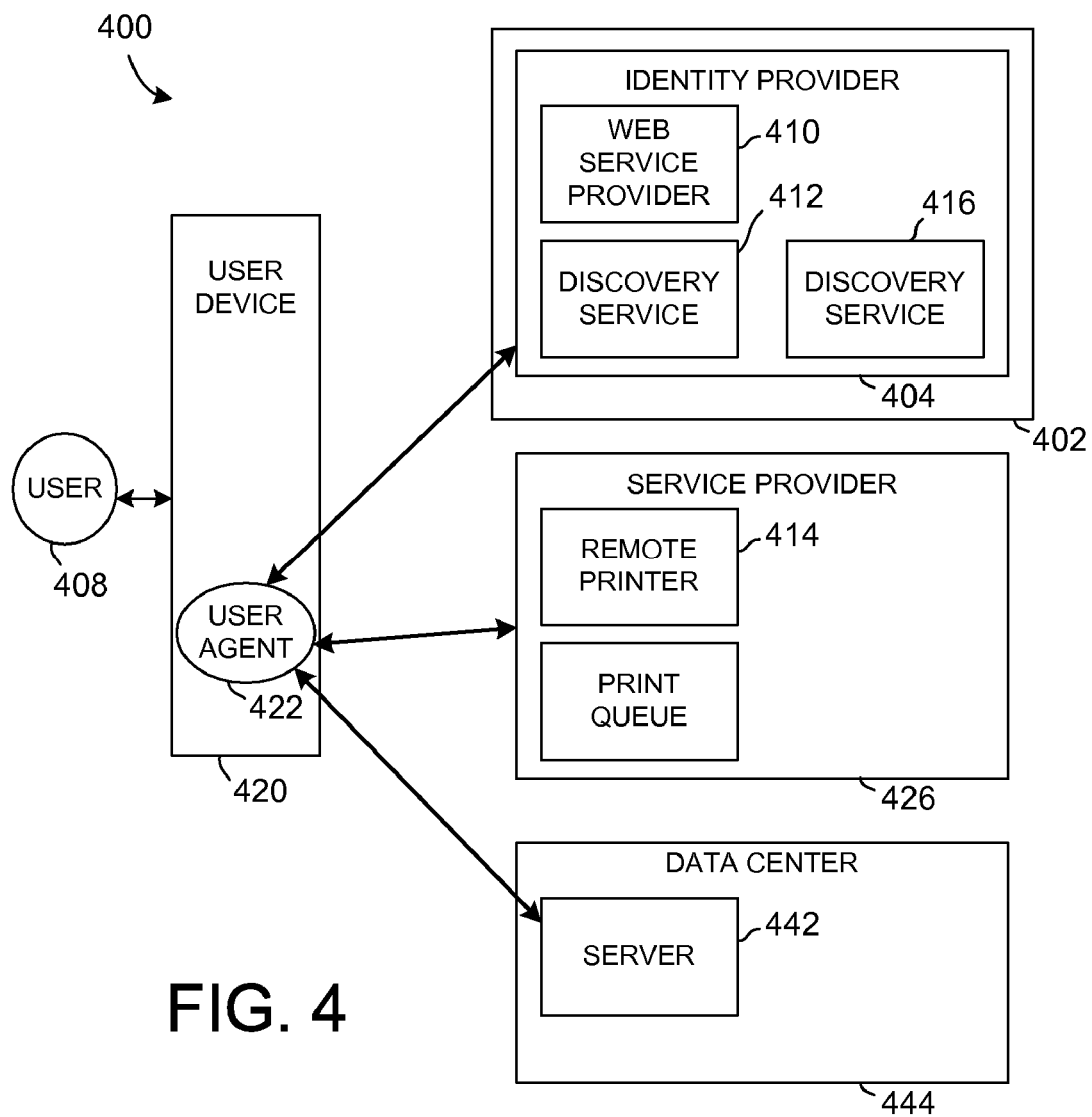
FIG. 4 is a schematic block diagram depicting an example embodiment of remote printing system based on federated identity web services.

Referring to FIG. 4, a schematic block diagram depicts an example embodiment of remote printing system 400 based on federated identity web services. An Identity Provider (IDP) 404 operates a print-enabled identity server such as that described in relation to FIG. 1 and is capable of authenticating the user 408, storing profile information including address, preferences such as a preferred location for sending print jobs, and payment information such as credit card/Paypal data. The IDP 404 typically supports versions of identity federation protocols such as SAML, Liberty ID-FF and Liberty ID-WSF (Identity Web Services Framework). The IDP 404 hosts a Web Service Provider (WSP) 410 and a discovery service 412, which in combination answer client queries for finding remote printers 414 matching selected criteria. The IDP 404 also hosts an identity-based Payment Service 416, which handles the user's payment transactions. The IDP 404 in combination with the disclosed capabilities can be called a Hosted Identity Services platform 402.

The Identity Services platform 402 forms a single place for the user to store information such as profile, preferences, payment information, and the like. In a specific example implementation, the Identity Services platform 402 can incorporate HP Passport, a web-based application from Hewlett-Packard of Palo Alto, Calif., that enables creation of web profiles that enable seamless single sign-on through multiple web properties both within and outside Hewlett-Packard through use of the HP Select Federation product.

The Identity Services platform 402 can enable seamless single sign-on into internal and third-party content and/or service providers, for example accessory partners, video stores, gaming, and many others. A consumer of such content portals is expected to have printing requirements which the illustrative systems and methods satisfy.

The Identity Services platform 402 can be built on open standards such as Liberty and SAML federation protocols.

The federation remote printing system 400 can be implemented with Privacy Management capabilities to enable prompting of the user when policy decisions are to be made, and requesting consent before releasing sensitive information to a third party.

A user device 420, for example a user's mobile device, can have web-service client software that can be called a user agent 422. The user agent client software fetches the user's authentication token from the Identity Provider 404 and also sends queries to the IDP 404 for finding the user's preferred printer or finding a printer that is nearest to the current location of the user 408. Once the IDP 404 returns a handle to the specific Remote Printing server that is requested by the user, the user agent 422 then submits the print jobs to the requested server, for example possibly residing in a data center.

A server 442 residing in a data center 444 that processes and routes the print jobs has capabilities of a web service consumer (WSC) as defined in Liberty ID-WSF. The WSC manages the payment service of the user and subsequently sends a payment request to the payment service.

A manufacturer and/or seller of a mobile device can ship the mobile device with a "Remote Printer" option designating a particular printer in a "printer's view" of the device, which can be set as a "default" printer for mobile devices that ship with a particular operating system type. For users of mobile devices from other manufacturers or sellers, a client software download can be supplied free-of-charge that installs the user device web-service client on a system.

In case the user has an existing account associated with the manufacturer and/or seller of the mobile device, most profile information can be retrieved from the account database. If not, the user creates a profile that is stored at an Identity Provider 404 associated with the mobile device manufacturer and/or seller.

The user can select a favorite or default printer, or find a nearest in-store printer based current location. An option of having printouts mailed to a certain address can be supplied.

Figure 5:
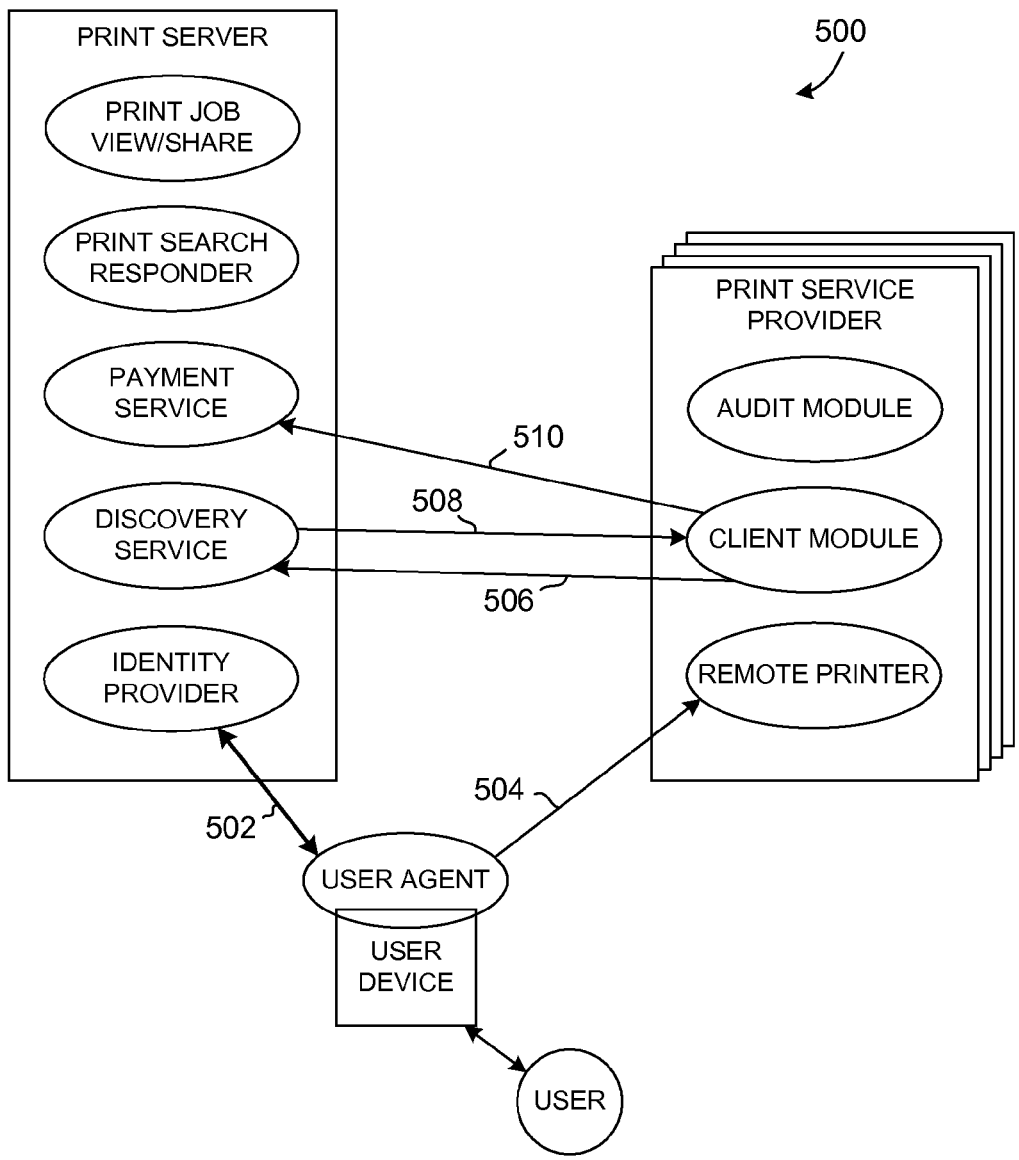
FIG. 5 is a sequence diagram showing an example of a sample workflow for using the illustrative remote printing technique.

Referring to FIG. 5, a sequence diagram depicts an example of a sample workflow 500 for using the illustrative remote printing technique. A user who is browsing 502 on his/her mobile device decides to print a page from some application like Microsoft Outlook or the browser. The print menu displays a "Print at remote printers" option. The dialog further presents options such as "Print at your designated 'favorite' printer" or "Find nearest in-store printer". The user device client on the user's device responds by attempting to establish whether the user has an existing authentication token that can be used. If not, the user is shown a login prompt to enter login credentials. The user device submits the credentials to the Identity Provider (IDP). The IDP verifies the credentials and returns the authentication token along with the address of the requested printing service.

Once the Remote Printer is been located 504, a consent prompt informs the user of the amount to be billed to the authorized credit card, and that the documents are to be mailed to the appropriate home address. For example, the information can be based on the user's stored profile and preferences. The user can change the option to arrange an in-store pickup and specify the location among available options, if desired. On confirmation, the print job is sent to a Print Service Provider (PSP), for example in a data center. From the data center, the print job can be routed to a store or sent to the user's home address, depending on the choice indicated during the transaction.

The web service consumer (WSC) at the data center contacts 506 the user's IDP to get a handle to the user's payment service.

The discovery service at the Identity Provider (IDP) returns 508 the address of the user's payment service.

On obtaining the information, the charges are sent 510 to the IDP and the transaction is completed.

In various implementations or in some conditions, optimizations to the technique can be employed. For example the login to the IDP can be automated. The capability is added to the web service client to automate the login process for the user, for example by linking system login credentials of the user with the associated account at the IDP. Each time the mobile device boots up, the user device attempts to validate the login credentials through the IDP. Thus, the authentication token is fetched beforehand and the user does not have to enter credentials during transactions.

Another possible optimization is the caching print jobs at a data center. For example, consumer value can be enhanced by offering a service such as "free shipping over $25". Many users might submit smaller print jobs, and may attain the threshold over 4 or 5 transactions. If the user has indicated in preference information at the IDP a desire for free shipping, the print jobs can be automatically cached and submitted at one time when the threshold is reached.

The illustrative remote printing system and associated method enable an intuitive, seamless and secure experience for consumers, thus redefining the user experience and creating new markets and enhancing brand value.

Use of a federated identity management system enables advanced capabilities such as standards-based federation, privacy management, and sophisticated web services that can manage authentication, payment, and the like.

The illustrative remote printing system and associated method coordinates operations of the Federation platform, web service client software on the mobile devices, a substantial printer base, federated identity, printing services, and hosted identity services platforms.

Figure 6:
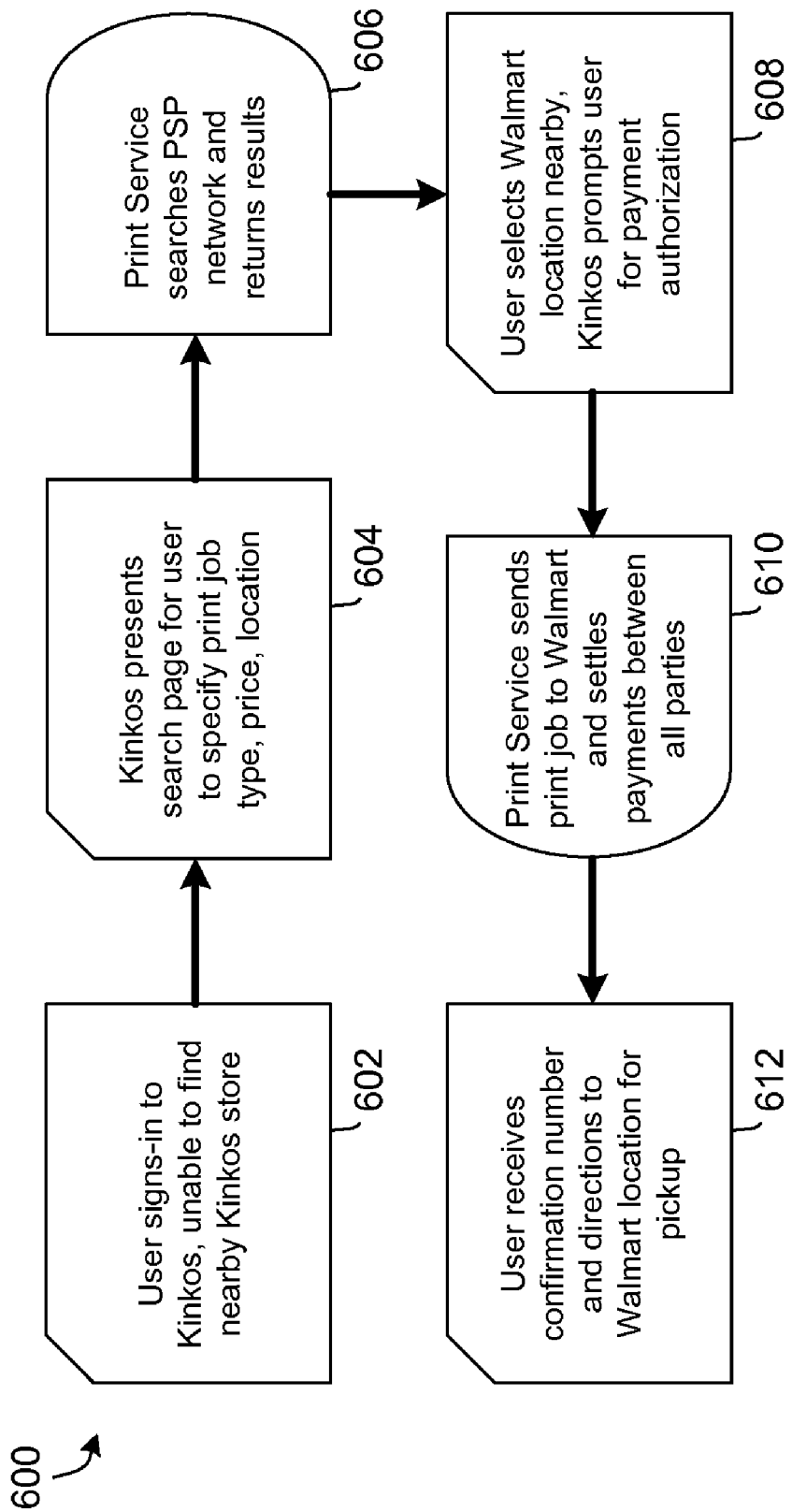
FIG. 6 is a process flow diagram showing an example transaction in a remote printing system.

Referring to FIG. 6, a process flow diagram illustrates an example transaction 600 in a remote printing system. In the example transaction 600, the illustrative remote printing system enables a user with account authorization at a first business, for example Kinko's, to seamlessly print at a nearby location of a second business, for example Walmart, for which the user does not have an account. The user logs 602 into a Kinko's website and desires to print nearby to a location where Kinko's does not have a branch. Kinko's presents 604 a search page to the user at which the user can specify parameters such as location, type of print job, price, and the like. An identity provider (IDP), for example Hewlett Packard HP-Passport web service, performs 606 the search and presents various choices. The user decides 608 to proceed with the print-job. HP-Passport contacts 610 the Walmart web service and sends details of print job and Walmart responds by calculating customer charges, and sends that information to HP-Passport. HP-Passport contacts Kinkos' web service to pass the amount to be charged to the customer and the amount to be charged back to HP-Passport, according to percentages agreed between HP-Passport and Kinko's. Kinko's prompts the user requesting authorization for the transaction. The user pays Kinko's and requests the print-job. HP-Passport keeps the percent agreed between Hewlett Packard and Walmart and sends the amount owed to Walmart. The user receives 612 a confirmation number and directions to the Walmart location, where the job can be picked up at the user's convenience.

Terms "substantially", "essentially", or "approximately", that may be used herein, relate to an industry-accepted tolerance to the corresponding term. Such an industry-accepted tolerance ranges from less than one percent to twenty percent and corresponds to, but is not limited to, functionality, values, process variations, sizes, operating speeds, and the like. The term "coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. Inferred coupling, for example where one element is coupled to another element by inference, includes direct and indirect coupling between two elements in the same manner as "coupled".

The illustrative block diagrams and flow charts depict process steps or blocks that may represent modules, segments, or portions of code that include one or more executable instructions for implementing specific logical functions or steps in the process. Although the particular examples illustrate specific process steps or acts, many alternative implementations are possible and commonly made by simple design choice. Acts and steps may be executed in different order from the specific description herein, based on considerations of function, purpose, conformance to standard, legacy structure, and the like.

While the present disclosure describes various embodiments, these embodiments are to be understood as illustrative and do not limit the claim scope. Many variations, modifications, additions and improvements of the described embodiments are possible. For example, those having ordinary skill in the art will readily implement the steps necessary to provide the structures and methods disclosed herein, and will understand that the process parameters, materials, and dimensions are given by way of example only. The parameters, materials, and dimensions can be varied to achieve the desired structure as well as modifications, which are within the scope of the claims. Variations and modifications of the embodiments disclosed herein may also be made while remaining within the scope of the following claims.

What is claimed is:

1. A data processing system comprising:
a print-enabled identity server comprising:
an identity provider operative in a federated identity system that authenticates a user, and stores profile information and payment information;
a Federated Print Search Responder (FPSR) and a discovery service hosted by the identity provider that operate in combination to answer a client's print-search queries for finding at least one remote printer according to client-designated criteria; and
an identity-based payment service that manages user payment transactions configured to send a billing request to the user's payment service.

2. The system according to claim 1 further comprising:
the Federated Print Search Responder (FPSR) configured to respond to search queries issued by users according to search criteria comprising at least one payment service provider location, print job price limits and ranges, printer type, printer capabilities, print options, transaction time limits and ranges.

3. The system according to claim 1 further comprising:
a user device; and
a user agent that executes operations on the user device including fetching a user authentication token from the identity provider, sending queries to the identity provider specifying search criteria for determining a target printer, and submitting print jobs to a remote printing server identified by the identity provider.

4. The system according to claim 1 further comprising:
the print-enabled identity server further comprising:
a plurality of software modules that route print jobs to a selected destination print service provider (PSP), identify location of a user's payment service and sending a billing request to the user's payment service, audit transactions comprising logging information on source and destination print service providers (PSPs), amount charged to the user, and transaction information.

5. The system according to claim 4 further comprising:
a print cache that caches print jobs and consolidates submission of the cached print jobs.

6. The system according to claim 1 further comprising:
the identity provider, the Federated Print Search Responder (FPSR), the discovery service, and the identity-based payment service configured for installation and integration with at least one print service provider (PSP) online infrastructure in a federated network of PSPs, enabling printing at PSPs in the federated network with no constraint for a user to have payment accounts with the PSPs in the federated network.

7. The system according to claim 1 further comprising:
a user device;
a user agent integrated with the user device and configured to send to the print enabled identity server a request for an electronic print job directed to at least one print service provider (PSP); and
the print-enabled identity server configured to relay the electronic print job to a destination PSP system.

8. The system according to claim 1 further comprising:
a plurality of transaction audit modules distributed to a source print service provider (PSP), the print-enabled identity server, and a destination PSP that logs detailed audit trails of transaction and financial information.

9. The system according to claim 1 further comprising:
a print job view/share application that creates a consolidated list of print job history across a plurality of print service providers (PSPs) for a user, and enables the user to view the consolidated list and selectively grant access by sending of invitation links to user contacts.

10. A computer-executed method for print management in a federated identity system comprising:
authenticating a user for printing access in a federated identity system;
storing user profile, preference, and payment information in the federated identity system;
answering a client's queries for identifying at least one remote printer according to client-designated criteria; and
managing user payment transactions via sending a billing request to the user's payment service for a user holding an account with at least one print service provider (PSP) of PSP members of the federated identity system.

11. The method according to claim 10 further comprising:
prompting the user for determination of privacy policy decisions and preferences; and
requesting consent before releasing information to a third party.

12. The method according to claim 10 further comprising:
responding to search queries issued by users according to search criteria comprising payment service provider location, print job price limits and ranges, printer type, printer capabilities, print options, transaction time limits and ranges.

13. The method according to claim 10 further comprising:
accessing the federated identity system from a user device with web connectivity comprising:
fetching a user authentication token;
sending queries to the federated identity system specifying search criteria for determining a target printer whereby the federated identity system submits print jobs to a remote printing server.

14. The method according to claim 10 further comprising:
managing a plurality of printers comprising:
receiving a print request;
routing the print request to a designated printer of the printer plurality;
identifying a payment service associated with a user associated with the print request; and
sending a payment request to the identified payment service.

15. The method according to claim 10 further comprising:
managing a plurality of printers comprising:
receiving a plurality of print requests;
routing the print requests to designated printers of the printer plurality;
caching print jobs corresponding to the print requests to at least one of the designated printers;
consolidating submission of the cached print jobs; and
consolidating a payment request of the consolidated print jobs.

16. The method according to claim 10 further comprising:
forming a federated network comprising a plurality of payment service provider online infrastructures;
enabling printing at print service providers (PSPs) in the federated network with no constraint for a user to have payment accounts with the PSPs in the federated network.

17. The method according to claim 10 further comprising:
accessing the federated identity system from a user device with web connectivity comprising:
automating login to the identity provider by linking system login credentials of the user with an associated account at the identity provider.

18. An article of manufacture comprising:
a non-transitory computer readable memory medium storing a computer readable program code embodied therein for managing print requests in a federated identity system, the computer readable program code further comprising:
code causing the controller to maintain a user record for a plurality of users in the federated identity system, the user record comprising profile, preference, and payment information;
code causing the controller to receive a user request and authenticate the user for printing access based on the user's user record;
code causing the controller to answer queries from the authenticated user and designate at least one remote printer for printing a print job based on criteria set by the user; and
code causing the controller to manage user payment transactions for a user holding an account with at least one print service provider (PSP) of PSP members of the federated identity system.

19. The article of manufacture according to claim 18 further comprising:
code causing the controller to send a user authentication token to the user;
code causing the controller to receive queries from the user specifying search criteria for determining a target printer; and
code causing the controller to submit print job to a remote printing server designated as the target printer.

20. The article of manufacture according to claim 18 further comprising:
code causing the controller to manage a plurality of printers comprising:
code causing the controller to receive at least one print request;
code causing the controller to route the at least one print request to a designated printer of the printer plurality;
code causing the controller to identify a payment service associated with a user associated with the print request;
code causing the controller to send a payment request to the identified payment service;

code causing the controller to cache print jobs corresponding to the print requests to at least one of the designated printers;
code causing the controller to consolidate submission of the cached print jobs; and
code causing the controller to consolidate a payment request of the consolidated print jobs.

* * * * *